United States Patent [19]

Hess et al.

[11] 4,305,090
[45] Dec. 8, 1981

[54] METHOD AND SYSTEM FOR CONTRAST CORRECTION OF COLOR TELEVISION SIGNALS

[75] Inventors: Heinz Hess, Weiterstadt; Reinhard Kirschenstein, Rossdorf, both of Fed. Rep. of Germany

[73] Assignee: Robert Bosch GmbH, Stuttgart, Fed. Rep. of Germany

[21] Appl. No.: 149,946

[22] Filed: May 15, 1980

[30] Foreign Application Priority Data

May 25, 1979 [DE] Fed. Rep. of Germany ....... 2921246

[51] Int. Cl.³ ............................................. H04N 9/535
[52] U.S. Cl. ...................................................... 358/27
[58] Field of Search ........................... 358/27, 40, 169

[56] References Cited

U.S. PATENT DOCUMENTS 4,152,720  5/1979  Fenton ................................. 358/27
4,167,750  9/1979  Tomimoto et al. .................. 358/27

FOREIGN PATENT DOCUMENTS 2649781  9/1976  Fed. Rep. of Germany .

*Primary Examiner*—Richard Murray
*Attorney, Agent, or Firm*—Frishauf, Holtz, Goodman & Woodward

[57] ABSTRACT

A contrast correction signal is generated to compensate for the limited contrast range of known image converters. The one of the primary color signals having the highest luminosity is low-pass filtered, its amplitude indicative of darker picture portions boosted, by use of a nonlinear amplifier, the resultant signal is subtracted from a blanking signal which has been subjected to the same nonlinear amplification and the resultant difference signal is multiplied by the composite television signal. The multiplier output constitutes the correction signal which is added to the composite color television signal. The method and system are illustrated with respect to the PAL, NTSC and SECAM systems.

9 Claims, 9 Drawing Figures

METHOD AND SYSTEM FOR CONTRAST CORRECTION OF COLOR TELEVISION SIGNALS

CROSS-REFERENCE TO RELATED APPLICATIONS AND PUBLICATIONS

DE-AS No. 26 49 781.

All of the above are hereby incorporated by reference into the present application.

The present invention relates to the contrast correction of color television signals. More specifically, it relates to systems in which the contrast correction signal is added to video signals which have been coded in accordance with the selected transmission system, such as, for example, the PAL, NTSC, or SECAM systems.

BACKGROUND AND PRIOR ART

Electronic image converters, i.e. pickup tubes and the tubes in the receiving sets normally have a contrast range in the order of magnitude of 60:1 and therefore cannot properly process the contrast ranges of magnitude of several hundreds to one which are present in natural scenes, slides, etc. Under these conditions, the characteristic transfer curve is subjected to an additional contrast correction following the usual gamma correction.

A contrast correction system for a color television system having a plurality of pickup tubes is described in German Published Patent Application DE AS No. 26 49 781, to which U.S. Pat. No. 4,152,720, FENTON, corresponds. In this system, two multipliers are used. It is therefore relatively expensive. Further, the contrast is changed in this system throughout the whole amplitude region, that is it is changed as much for the darker as it is for the lighter portions of the picture.

THE INVENTION

It is an object of the present invention to furnish a contrast correction system which is less expensive than the known system in that only one multiplier is used. Further, it is an object of the present invention to furnish a system wherein the darker portions of the picture are subjected to more correction than the lighter portions.

The present invention is based on a method for contrast correction of a composite color television signal which is generated in dependence upon a plurality of color signals and a blanking signal. In the known method, the color signal having the highest luminosity is selected from the plurality of color signals and a control signal corresponding thereto is generated. In accordance with the present invention, a contrast correction signal is then generated by low-pass filtering the control signal, boosting the amplitude of the filtered control signal in the amplitude range representing the darker parts of the image, subtracting the blanking signal from the control signal having the boosted amplitudes, and multiplying the resulting difference signal by the composite color television signal, thereby creating the contrast correction signal. The contrast correction signal is then added to the composite color television signal to create the final, corrected composite color television signal.

DRAWINGS ILLUSTRATING PREFERRED EMBODIMENTS

Figure 1:
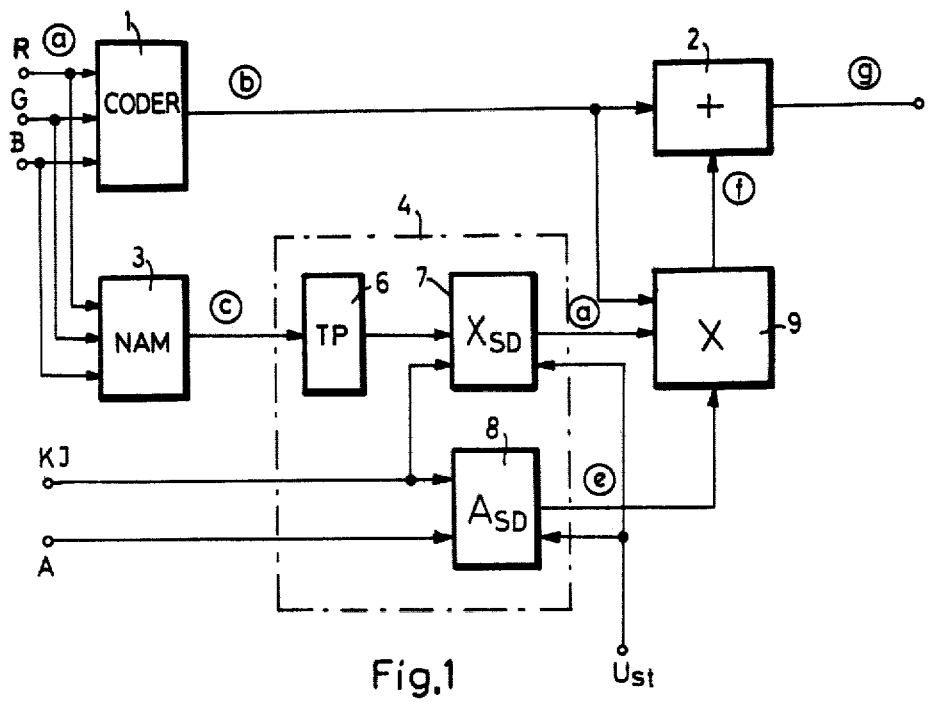
FIG. 1 is a block diagram of the circuit of the present invention as used in a PAL or NTSC system.
Figure 2:
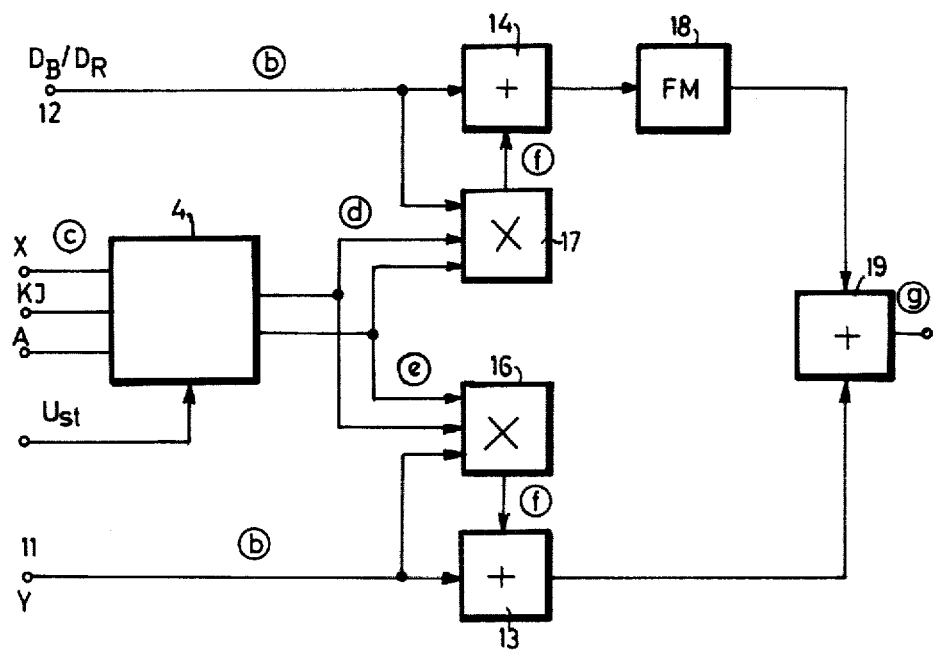
FIG. 2 is a block diagram for the present invention used in a SECAM system.
Figure 3:
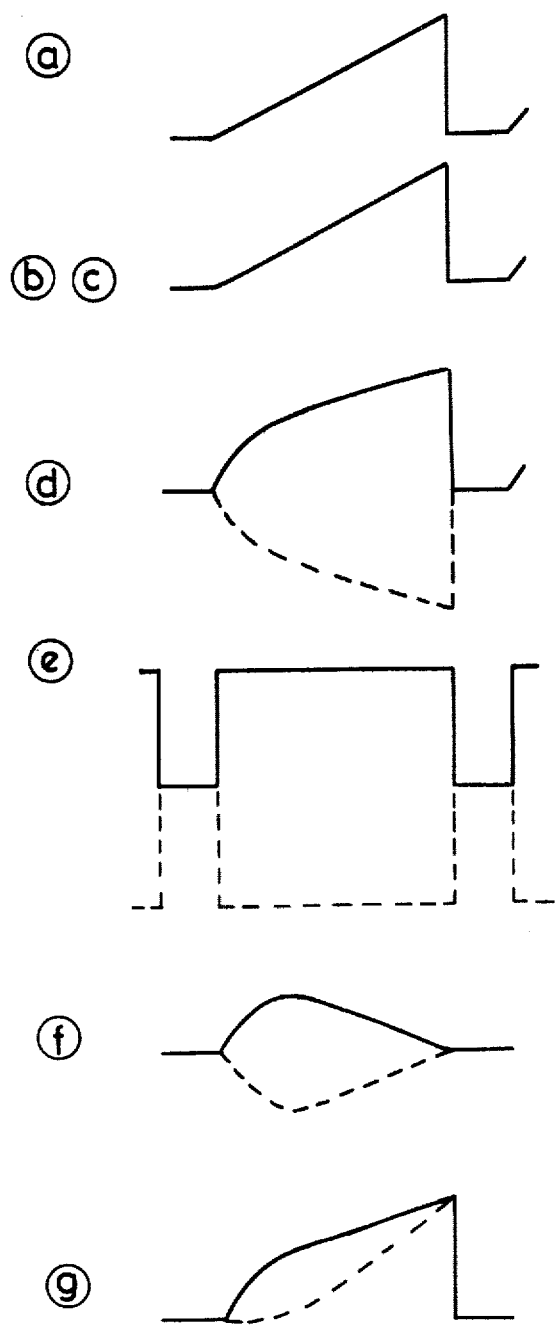
Figure 4:
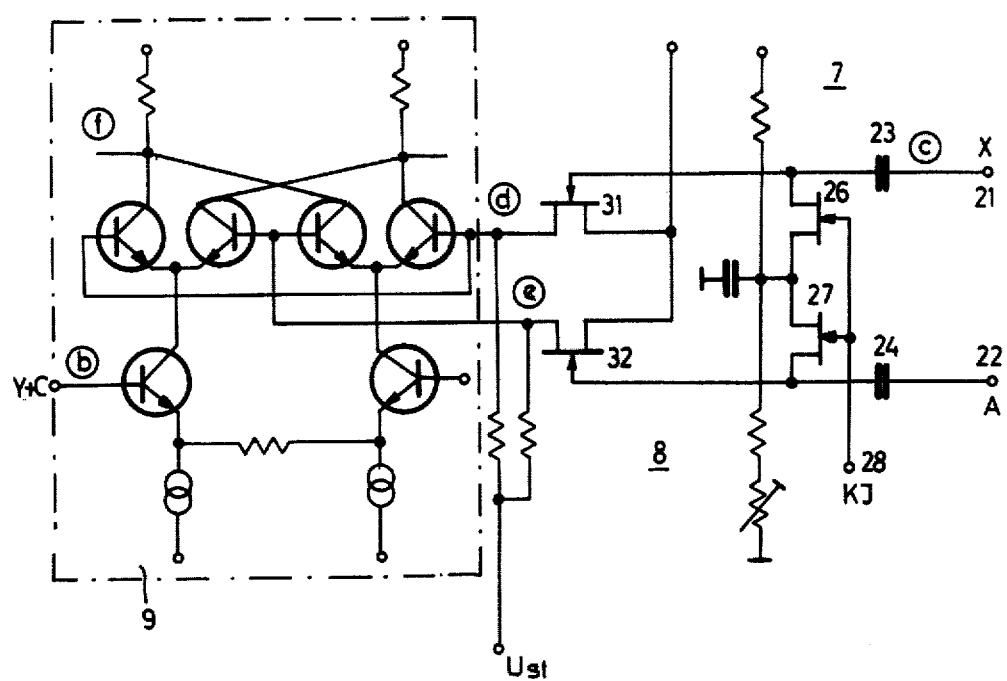

FIG. 3 including 3a–3g illustrates wave forms at several points in the systems of FIGS. 1 and 2; and FIG. 4 is a detailed circuit diagram of the blocks in FIGS. 1 and 2 used to generate the correction signal.

In FIG. 1, the color signals R, G, and B are applied to a coder 1 which generates a composite uncorrected color television signal in accordance with a predetermined coding system, such as the PAL or NTSC system. This composite color television signal is applied to one input of an adder stage 2. The color signals R, G and B are also applied to a nonadditive mixing stage, 3, which transmits the signal having the greatest luminosity to its output. The signals applied to stages 1, 2 and 3 are denoted in FIG. 3 by a and b while the signal at the output of stage 3 is denoted by c. These are indicated as sawtooth signals. The output signal of stage 3 is then applied to a signal processing stage 4 which in conjunction with a multiplier 9 constitutes the contrast correction signal generator shown in detail in FIG. 4. Stage 4 includes a low-pass filter 6 and two nonlinear amplifiers 7 and 8. Low-pass filter 6 transmits only signals in the lower frequency range, since this is the range which particularly requires contrast correction to allow details of the image to be viewed correctly. The delay time in low-pass filter 6 is matched to that in coder 1, so that a separate matching of delay times is not required. The output of low-pass filter 6 is applied to one input of the nonlinear amplifier 7 in which a so-called "black stretching" of the signal takes place. The signal designated d in FIG. 3 is available at the output of stage 7. The blanking signal A is applied to nonlinear amplifier 8 which is identical in construction with nonlinear amplifier 7. A reference voltage $U_{St}$ is applied to stages 7 and 8, as are clamping pulses. The signal at the output of stage 8 is denoted by e in FIG. 3. The signals d and e are applied to the control inputs of a multiplier stage 9. Multiplier stage 9 has a further input receiving the signal from coder 1. The contrast correction signal available at the output of multiplier 9 should go to zero both in the blanking interval and at the 100 percent white point. This is achieved by obtaining the difference between signals d and e in multiplier stage 9. The signal f at the output of multiplier stage 9 is applied to the second input of adder stage 2 where it is added to the uncorrected signal, so that the contrast corrected signal g is available at the output of adder stage 2.

In FIG. 2, a contrast correction system according to the present invention is shown for a SECAM system. Input terminals 11 and 12 receive, respectively, the luminance signal Y and the line sequential color difference signal $D_B/D_R$. These signals shaped as in b are applied to the first inputs of adder stages 13 and 14, respectively. The same signal processing stage 4 shown in FIG. 1 and including the low-pass filter and two nnlinear amplifiers is also provided. The signal c, namely the signal at the output of nonadditive mixing stage 3, clamping pulses KI, blanking signal A and reference signal $U_{St}$ are applied to inputs of this stage. As in FIG. 1, the outputs of this stage are denoted by signals d and e which are, respectively, applied to a multiplier stage 17 and 16. The luminance signal Y is applied to the other input of multiplier stage 16, while the line sequential color difference signal $D_B/D_R$ is applied to the other input of multiplier stage 17. The signals shown as f in FIG. 3 are available at the outputs of stages 16 and 17. The signals f are applied to the second inputs of adder stages 13 and 14. The output of stage 14 is applied to the input of a frequency modulator 18. The frequency modulated color difference signal is available at the output of stage 18. The signals at the outputs of stages 18 and 13 are added together in a further adder 19, so that the contrast corrected color television signal according to the SECAM standard is available at the output of stage 19.

Nonlinear amplifiers 7 and 8 as well as the multiplier stage 9 are shown in detail in FIG. 4. The signal c at the output of nonadditive mixer 3 is applied at terminal 21, while the blanking signal is applied at a terminal 22. The signals are applied through capacitors 23 and 24, respectively, to a clamping circuit including a field effect transistor 26, 27, respectively. Field effect transistors 26 and 27 are controlled by clamping pulses KI applied at a terminal 28. The signal c after clamping is applied to a field effect transistor 31 which acts as a resistor whose resistance value varies as a function of applied voltage. The clamped blanking signal is similarly applied to a field effect transistor 32. If, for example, a sawtooth voltage is applied to the gate of FET 31, then the resistance of the drain-source circuit decreases with increasing gate-source voltage. Thus a signal denoted by d appears at the drain of FET 31 in response to the sawtooth signal applied to its gate. The polarity and amplitude of the voltage d are determined by the choice of polarity and amplitude of the reference voltage $U_{Sf}$. The same processing is applied to blanking signal A. The signals d and e which have thus been subjected to the same processing are applied to the positive and negative control inputs of multiplier stage 9. Multiplier stage 9 consists of a first and second constant current source, 33, 34 connected, respectively, to the emitter of a transistor 35 and 36. The collector of transistor 35 is connected to the emitters of transistors 37 and 38. The base of transistor 37 receives the signal d, while that of transistor 38 receives the signal e. The collectors of transistors 37 and 38 are connected to a source of positive potential through resistors 39 and 40, respectively. The base of transistor 38 is further connected to the base of a transistor 41 whose collector is connected to the collector of transistor 37 and whose emitter is connected in common with the emitter of a transistor 42. The signal d is applied to the base of transistor 42, while its collector is connected to the collector of transistor 38. The signal f is derived from the collector of transistor 42. The emitters of transistors 41 and 42 are connected in common to the emitter of transistor 36. The base of transistor 36 receives signal b, i.e. the composite color television signal.

Thus, in multiplier stage 9, the difference between signals d and e is formed. This difference formation causes the correction signal f to go to zero both at the black and at the white extremities. The signal d-e is multiplied by the signal b the resulting product constituting the contrast correction signal f. It will be noted that in the circuit shown in FIG. 4 the chrominance portion C and the luminance portion Y of the composite color television signal are weighed equally. Thus, no saturation changes can take place as is the case in conventional black stretch systems.

Various changes and modifications may be made within the scope of the inventive concepts.

We claim:

1. In a method for contrast correction of a composite color television signal generated in dependence upon a plurality of color signals and a blanking signal, said method comprising the step of selecting the color signal having the highest luminosity from said plurality of color signals and generating a control signal corresponding thereto, said control signal having a first amplitude range representing the darker portions of an image to be televised and a second amplitude range comprising the lighter portions of said image:
   a process for generating a contrast correction signal, comprising the steps of
   low-pass filtering said control signal, thereby creating a filtered control signal;
   boosting the amplitude of said filtered control signal in said first amplitude range, with respect to said second amplitude range thereby creating a nonlinear control signal;
   subtracting said blanking signal from said nonlinear control signal, thereby creating a difference signal; and
   multiplying said difference signal by said composite color television signal, thereby creating said contrast correction signal.

2. A method as set forth in claim 1, wherein said composite color television signal is created from said color signals by processing according to the PAL or NTSC standard.

3. A method as set forth in claim 1, wherein said composite color television signal is a SECAM signal, whereby said method further comprises the step of generating a luminance signal and a line sequential color difference signal $(D_B/D_R)$;
   wherein said step of multiplying said difference signal by said composite color television signal comprises multiplying said line sequential color difference signal and said luminance signal individually by said difference signal, thereby creating a first and second contrast correction signal.

4. In a system for contrast correction of a composite color television signal generated in dependence upon a plurality of color signals and a blanking signal, said system comprising means for selecting the color signal having the highest luminosity from said plurality of color signals and generating a control signal corresponding thereto, said control signal having a first amplitude range representing the darker portions of an image to be televised and a second amplitude range comprising the lighter portions of said image:
   apparatus for generating a contrast correction signal, comprising
   low-pass filter means for filtering said control signal, thereby creating a filtered control signal;
   means for boosting the amplitude of said filtered control signal in said first amplitude range, with respect to said second amplitude range thereby creating a nonlinear control signal; and
   means for subtracting said blanking signal from said nonlinear control signal, thereby creating a difference signal and for multiplying said difference signal by said composite color television signal, thereby creating said contrast correction signal.

5. A system as set forth in claim 4, wherein said boosting means comprises a first nonlinear amplifier (31);

further comprising a second nonlinear amplifier (32) identical to said first nonlinear amplifier, for amplifying said blanking signal prior to application to said subtracting and multiplying means.

6. A system as set forth in claim 5, further comprising means (26, 27) for clamping said blanking signal and said control signal to a predetermined reference level.

7. In a method for contrast correction of a composite color television signal generated in dependence upon a plurality of color signals and a blanking signal, said method comprising the step of selecting the color signal having the highest luminosity from said plurality of color signals and generating a control signal corresponding thereto, said control signal having a first amplitude range representing the darker portions of an image to be televised and a second amplitude range comprising the lighter portions of said image:

a process for generating a contrast correction signal, comprising the steps of low-pass filtering said control signal, thereby creating a filtered control signal;

boosting the amplitude of said filtered control signal in said first amplitude range, thereby creating a nonlinear control signal;

subtracting said blanking signal from said nonlinear control signal, thereby creating a difference signal;

multiplying said difference signal by said composite color television signal, thereby creating said contrast correction signal;

wherein said composite color television signal is a SECAM signal, whereby said method further comprises the step of generating a luminance signal and a line sequential color difference signal ($D_B/D_R$); and wherein said step of multiplying said difference signal by said composite color television signal comprises multiplying said line sequential color difference signal and said luminance signal individually by said difference signal, thereby creating a first and second contrast correction signal.

8. A method as set forth in claim 7, further comprising the steps of adding said first and second contrast correction signal to said line sequential color difference signal and said luminance signal, respectively, thereby creating, respectively, a first and second corrected signal, frequency modulating said first corrected signal, and adding said frequency modulated first corrected signal to said second corrected signal, thereby creating a contrast corrected composite color television signal.

9. In a system for contrast correction of a composite color television signal generated in dependence upon a plurality of color signals and a blanking signal, said system comprising means for selecting the color signal having the highest luminosity from said plurality of color signals and generating a control signal corresponding thereto, said control signal having a first amplitude range representing the darker portions of an image to be televised and a second amplitude range comprising the lighter portions of said image;

apparatus for generating a contrast correction signal, comprising low-pass filter means for filtering said control signal, thereby creating a filtered control signal;

means for boosting the amplitude of said filtered control signal in said first amplitude range, thereby creating a nonlinear control signal;

means for subtracting said blanking signal from said nonlinear control signal, thereby creating a difference signal and for multiplying said difference signal by said composite color television signal, thereby creating said contrast correction signal;

wherein said composite color television signal is a SECAM signal;

wherein said system further comprises means for generating a luminance signal and a line sequential color difference signal;

wherein said subtracting and multiplying means comprises a first and second multiplier stage (16,17) for, respectively, multiplying said luminance signal and said color difference signal by said difference signal, thereby creating a first and second contrast correction signal; and further comprising adder means (13,14) for adding said first and second contrast correction signals to said luminance and color difference signal, respectively, thereby creating a contrast corrected luminance and color difference signal, frequency modulator means (18) connected to said adder means for frequency modulating said contrast corrected color difference signal, thereby furnishing a frequency-modulated signal, and output adder means (19) for adding said frequency-modulated signal to said contrast corrected luminance signal, thereby furnishing a contrast corrected composite color television signal.

* * * * *